March 17, 1970  D. C. WILSON  3,501,318
METHOD AND APPARATUS FOR PROCESSING PRODUCTS IN
FLEXIBLE CONTAINERS
Filed Dec. 26, 1967  6 Sheets-Sheet 1
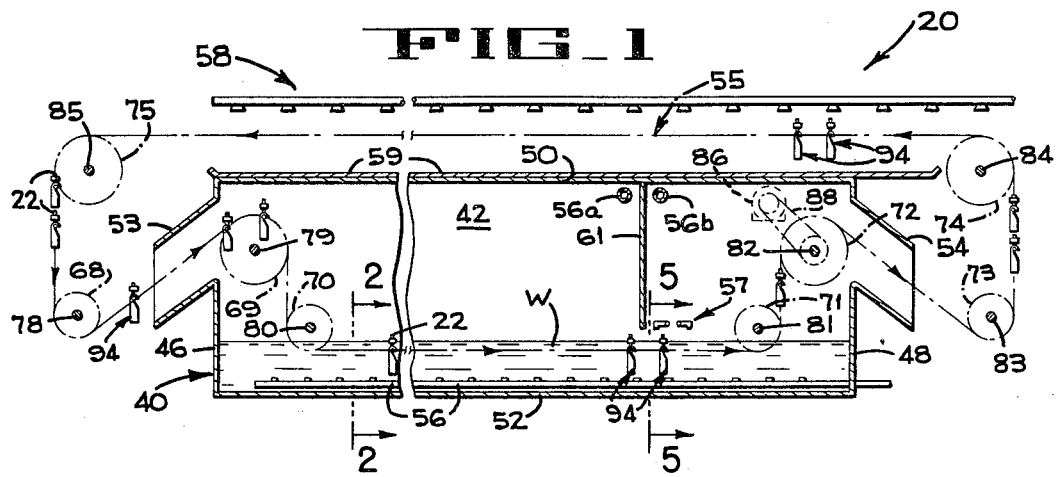
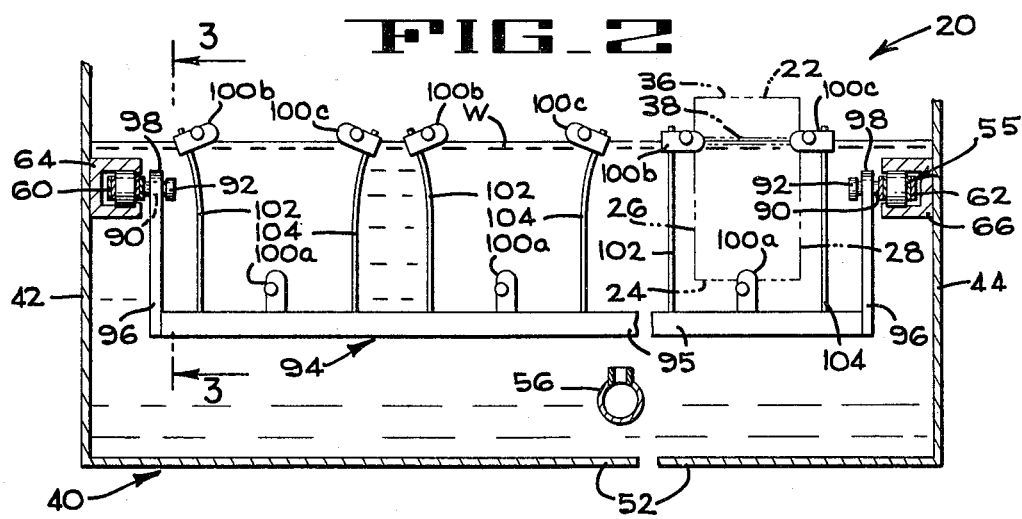
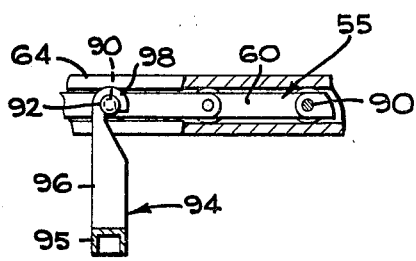
INVENTOR.
DONALD C. WILSON
BY F. W. Anderson
C. E. Tripp
ATTORNEYS

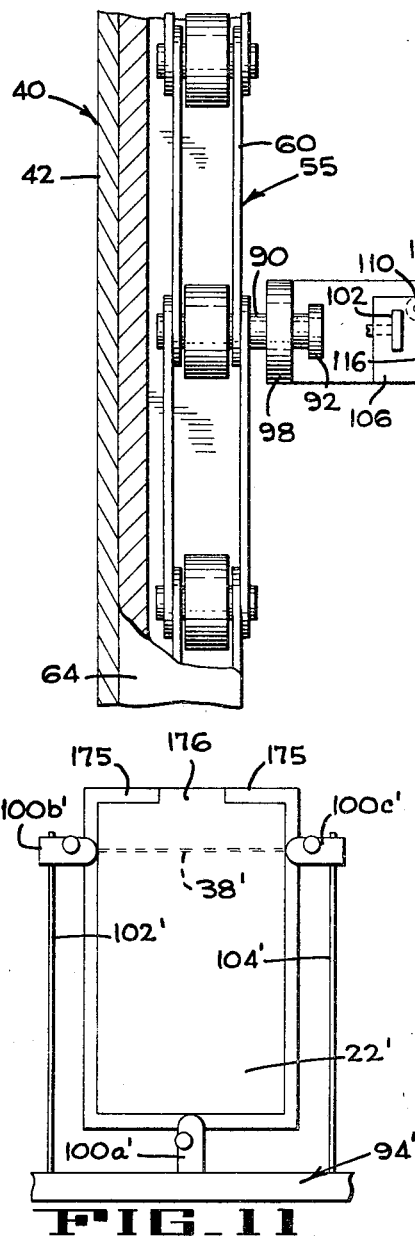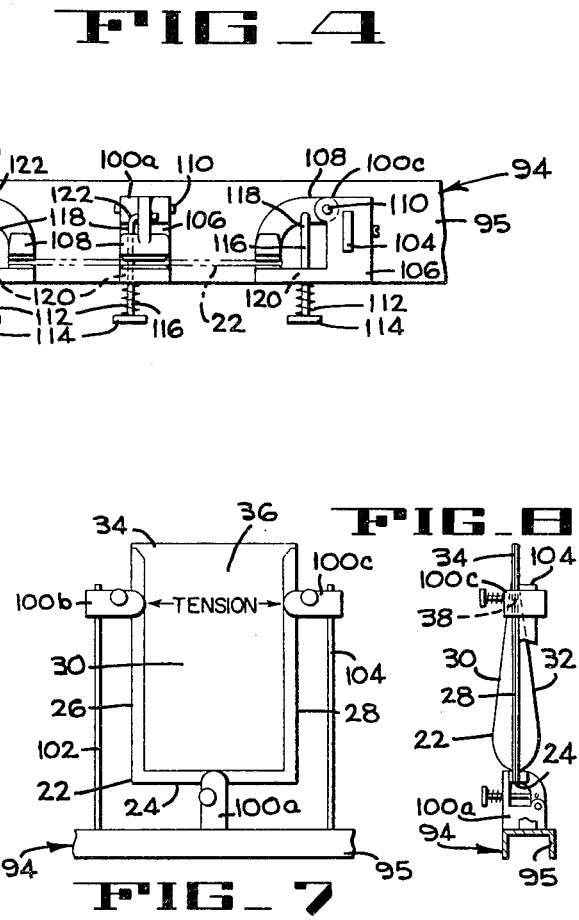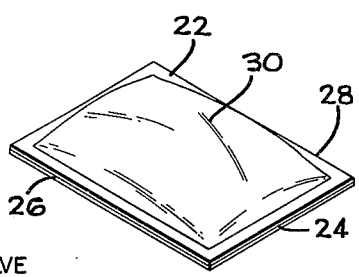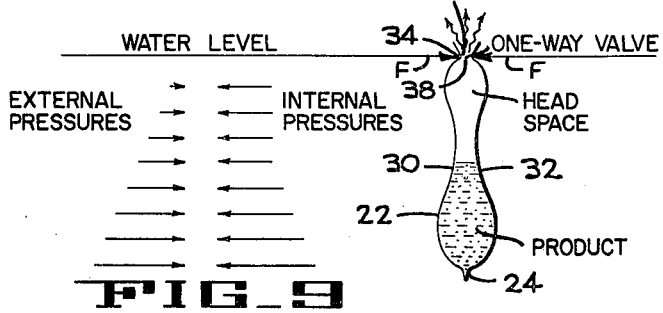

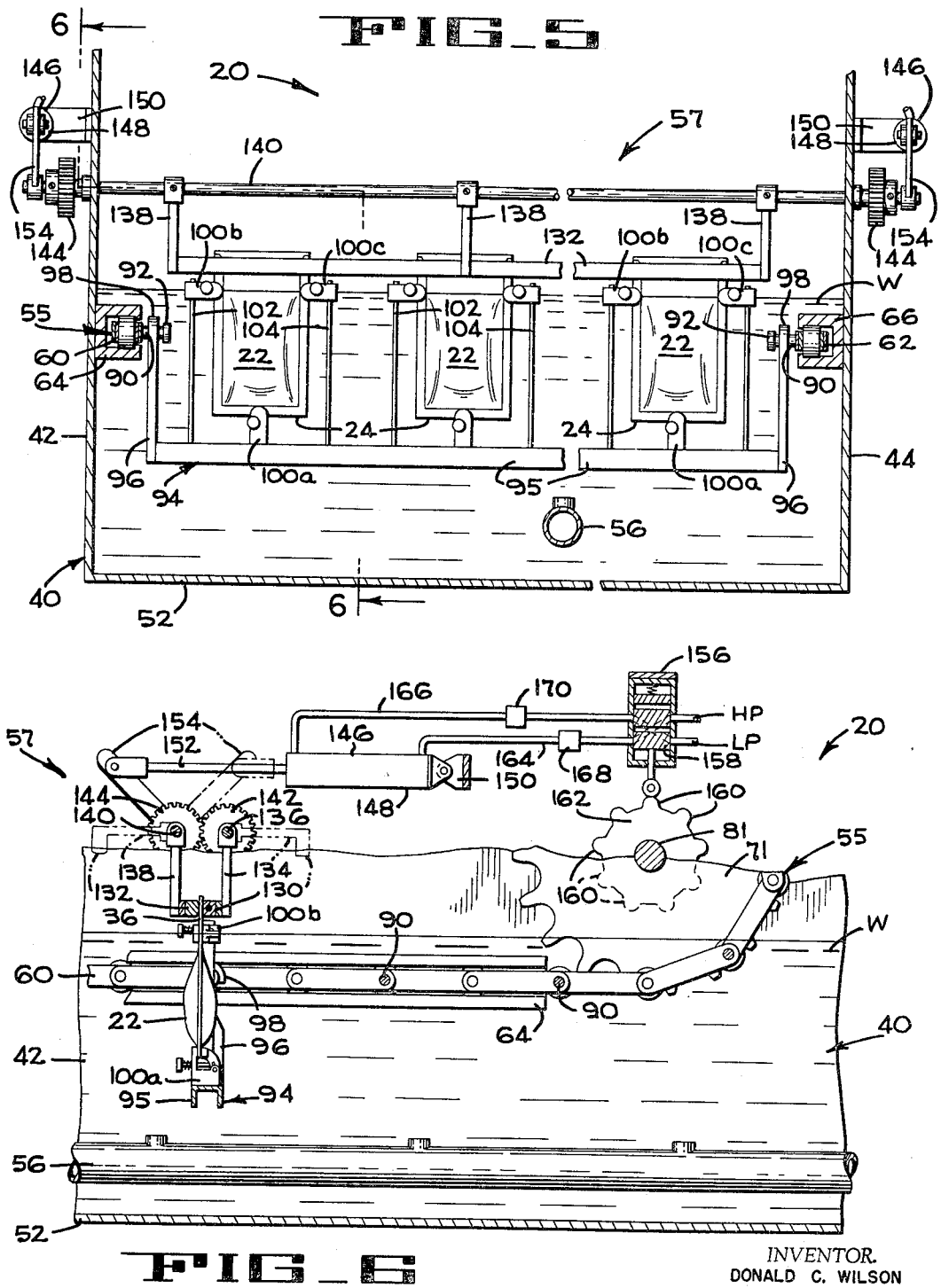

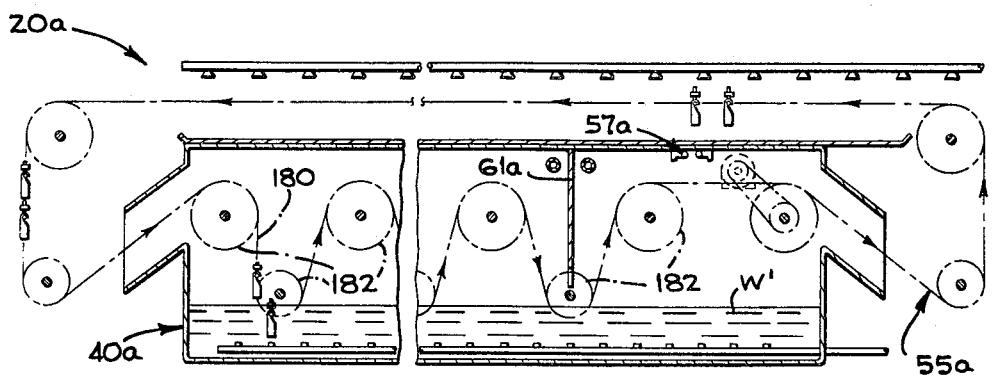
FIG_12
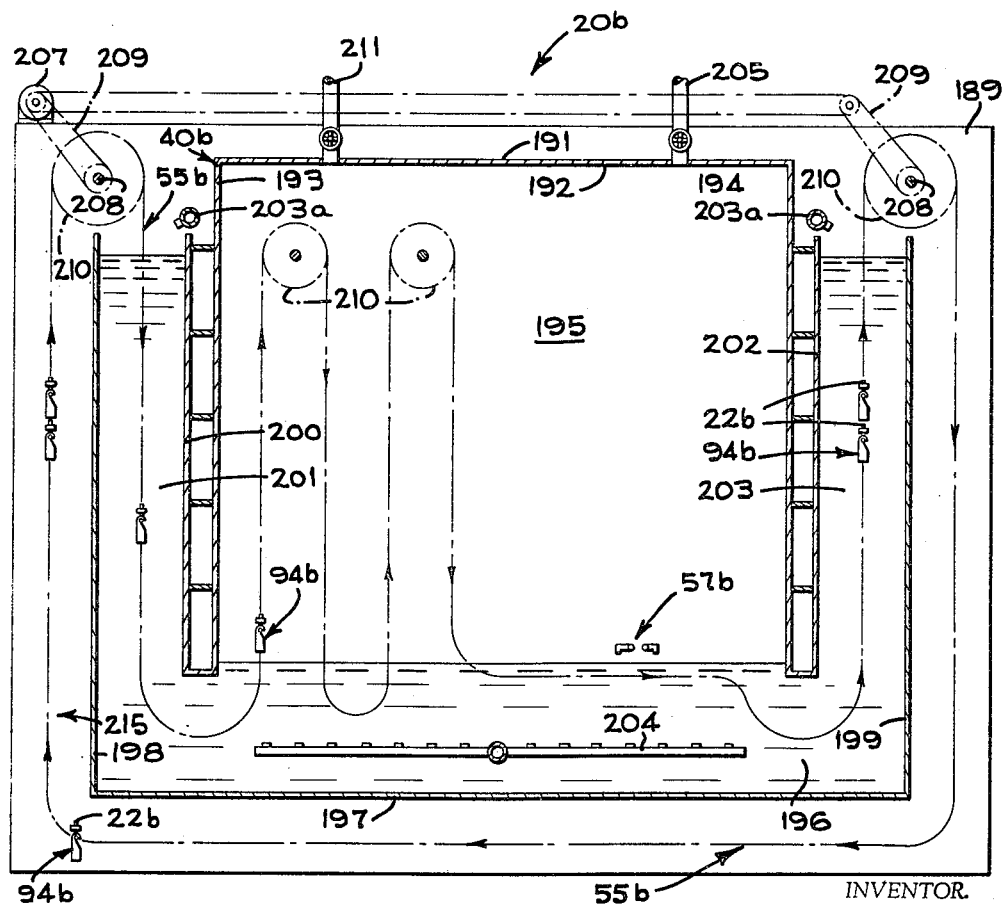
FIG_13

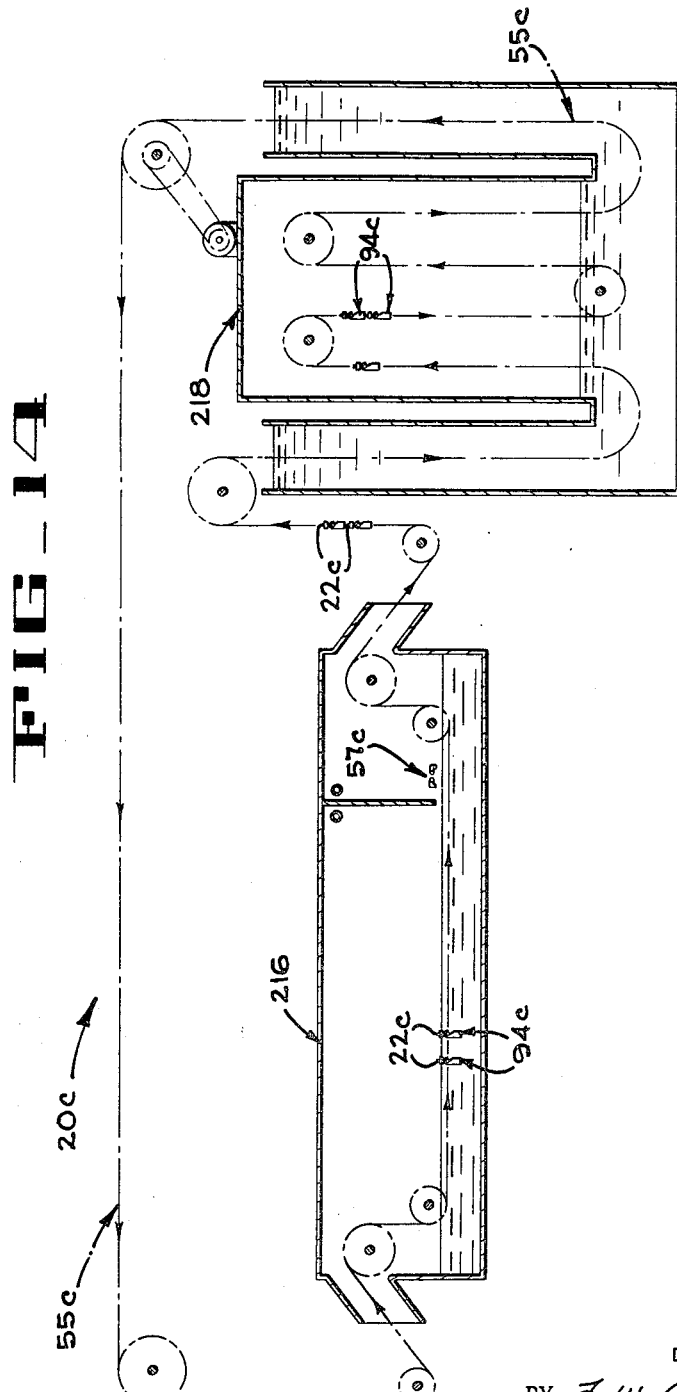

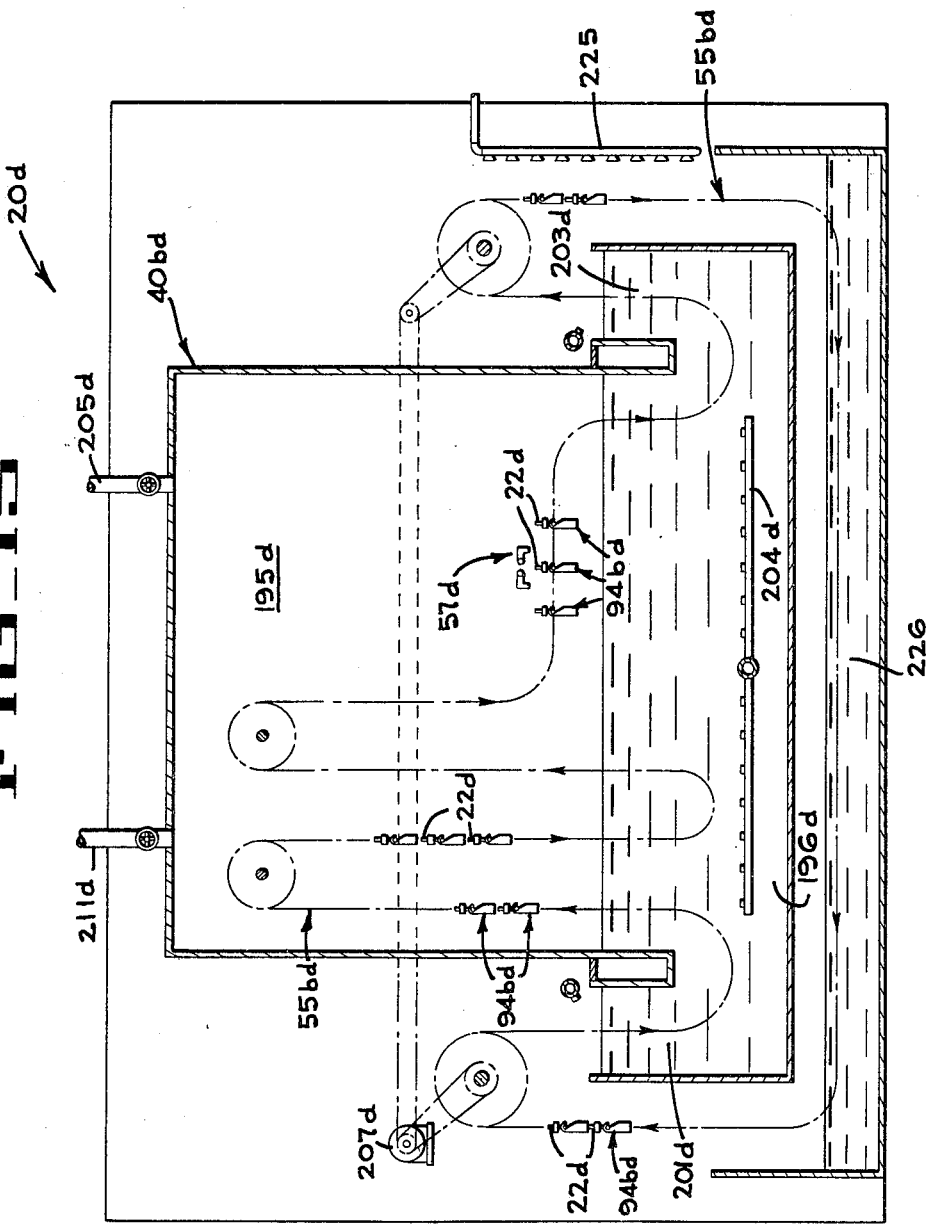

United States Patent Office 3,501,318
Patented Mar. 17, 1970

3,501,318
METHOD AND APPARATUS FOR PROCESSING PRODUCTS IN FLEXIBLE CONTAINERS
Donald C. Wilson, San Jose, Calif., assignor to FMC Corporation, San Jose, Calif., a corporation of Delaware
Filed Dec. 26, 1967, Ser. No. 693,330
Int. Cl. A23c 3/02
U.S. Cl. 99—185                33 Claims

ABSTRACT OF THE DISCLOSURE

A method and apparatus for heat treating a flexible container which includes gripping a filled flexible resilient container near its unsealed mouth to transversely tension the container thereby providing a one-way valve near the upper end thereof which prevents entry of fluid into the container but permits passage of gas out of the container. Moving the container through a heating medium whereby cooking gases and steam will form within the container due to the heat treatment. Squeezing the container by submerging a portion of the container in a liquid heating medium which reduces the size of the container head space thereby increasing the pressure of gases within the container causing the air, cooking gases and steam to flow from the container through the one-way valve. Thereafter sealing the upper end of the container by application of heat and pressure while the container is gripped and is either in the steam atmosphere above the liquid or is partially submerged.

CROSS REFERENCE TO RELATED APPLICATIONS

The method and apparatus of the present invention is an improvement over the apparatus disclosed in copending Csernak application Ser. No. 459,768 which was filed on May 28, 1965 and is assigned to the assignee of the present invention. This application discloses an apparatus for mechanically evacuating air from the potentially large head space of a flexible container.

BACKGROUND OF THE INVENTION

Field of the invention

This invention pertains to an improved method and apparatus for heat treating products in flexible containers, which containers are also referred to as pouches. These flexible containers are only partially filled with a product and have potentially large head spaces within which air and other non-condensable gases may form. The air that is present in the containers is in the form of headspace air, air dissolved in the packaging medium or included in the product, and interstitial air which is air that is present within the interstices of the product. This air must be evacuated from the containers before sealing in order to prevent oxidation of the product.

In addition to the problem of evacuating air from the partially filled containers to prevent undesirable oxidation of the product, it is well known in the art of sterilizing food products that steam as well as gases due to the cooking of the product form within a container during sterilization. In addition, the noncondensable gases present in the product and in the container head space at the time of closure increase in pressure as the temperature rises to the sterilizing temperature. Thus, if food filled containers are to be sterilized by saturated steam and are sealed before sterilization, the pressure built up within the containers will be greater than the pressure acting on the external surfaces of the containers. If the containers are cans, for example, with relatively thick walls, the wall strength is usually sufficient to withstand the pressure differential. However, if food products are sealed in flexible containers or pouches before sterilizing, the relatively weak seals of the pouches tend to burst and preclude sterilization in saturated steam making it necessary to sterilize the sealed pouches either in a steam-air mixture which is inefficient, or in hot water subjected to an overriding pressure which is awkward.

It is also well known in the art that sugars react with proteins when sterilized at high temperatures, for example at 245° F., and result in the generation of small quantities of carbon dioxide. If the containers are sealed before high temperature sterilization, the carbon dioxide will remain in the product and it is believed that this carbon dioxide will give certain products a "canned" flavor. In accordance with the present invention substantially all the cooking gases, including carbon dioxide, are vented from the containers thereby providing subtle flavor differences in certain products.

DESCRIPTION OF THE PRIOR ART

An air purging method is disclosed in U.S. Patent No. 3,108,881 to Shaw et al. and is somewhat pertinent to the method and apparatus of the present invention. The Shaw et al. patent discloses a method wherein a flexible container is filled with a product and a small amount of liquid. The upper end of the flexible container is then partially sealed to provide a tortuous vent passage, the container is heated to cause the liquid to vaporize and thereby expel the air therefrom through the tortuous path. The container must then be cooled causing the aqueous vapor within the container to condense wherein the condensed moisture in the tortuous passageway is said to temporarily seal the vent passage. The upper end of the container is then permanently sealed after the cooling operation.

SUMMARY OF THE INVENTION

In accordance with the present invention a food product to be sterilized is filled in such quantity as to incompletely fill the containers, into heat sealable, flexible containers each having three edges sealed and its upper end open. The side edges of each filled but unsealed container are gripped at points slightly below the unsealed upper end thereof and these edges are resiliently urged away from each other to stretch the material therebetween thereby defining a one-way valve. By virtue of the one-way valve, gases, air, and vapor formed within the container head space may escape therefrom, but fluids acting on the external surfaces of the flexible container cannot enter the container.

The gripped containers are then carried by a conveyor through a heating medium thereby sterilizing the contents of the containers. The heating medium includes a liquid portion through which the flexible containers are advanced thereby applying a pressure head to the external surfaces of the containers. Because of the flexibility of plain and laminated film containers, the hydrostatic pressure generated by submergence to less than the full depth of each partially filled container is sufficient to cause the walls of the flexible container above the product surface to collapse against each other, thereby expelling the head space gases within each container through the one-way valve in the upper end thereof and also reducing or eliminating any volumetric capacity for gases evolved from the product during processing. With the containers gripped and partially submerged, the upper ends are sealed by application of heat and pressure. The containers are thereafter cooled to stop the cooking process, and are subsequently removed from the machine.

Alternately, the gripped containers may be sealed without the re-entry of non-condensable gases by lifting the containers entirely above the previous submergence level into an atmosphere of pure saturated or superheated steam thereafter sealing the upper ends by application of heat and pressure. Such containers thereafter cooled to stop the cooking process will permit the condensation of head space water vapor resulting in a package equivalent to that sealed while the containers are partially submerged.

BRIEF DESCRIPTION OF THE DRAWINGS

FIGURE 1 is a diagrammatic vertical central section of a first embodiment of an atmospheric cooker and cooler of the present invention.

FIGURE 2 is an enlarged transverse section taken along lines 2–2 of FIGURE 1 showing a carrier adapted to support several containers.

FIGURE 3 is a vertical section taken along lines 3–3 of FIGURE 2 illustrating the manner of connecting the carriers to the conveyor chains.

FIGURE 4 is an enlarged plan illustrating a fragment of a carrier with three of the container supporting clamps thereon, certain parts being broken away.

FIGURE 5 is an enlarged transverse section taken along lines 5–5 of FIGURE 1 illustrating a container sealing mechanism.

FIGURE 6 is an enlarged side elevation taken substantially along line 6–6 of FIGURE 5 illustrating the actuating mechanism for the sealer.

FIGURE 7 is a front elevation of a fragment of a carrier and a filled flexible container with three edges sealed and the upper end open, said view illustrating the manner of tensioning the upper portion to provide a one-way valve.

FIGURE 8 is a side view of the container of FIGURE 7 and illustrates the shape of the filled container prior to being immersed in a liquid.

FIGURE 9 is a side view of the container after the container has been submerged in a liquid, and diagrammatically illustrates the internal and external pressures acting upon the container walls immediately after the container has been submerged.

FIGURE 10 is a perspective of a flexible container after being sealed and sterilized.

FIGURE 11 is a front elevation similar to FIGURE 7 but illustrating a larger container having its upper end partially sealed prior to cooking.

FIGURE 12 is a diagrammatic central vertical section of a second embodiment of the invention illustrating a cooking and cooling apparatus similar to FIGURE 1 but wherein the cooking is accomplished primary in a steam atmosphere.

FIGURE 13 is a diagrammatic central section of a third embodiment of the invention illustrating a hydrostatic cooker wherein the sterilization occurs at high temperatures and at superatmospheric pressures.

FIGURE 14 is a diagrammatic central section through a fourth embodiment of the invention wherein the containers are partially sterilized and are sealed after being passed through an atmospheric cooker, and are thereafter passed through a hydrostatic cooker for complete sterilization.

FIGURE 15 is a diagrammatic central section through a fifth embodiment of the invention illustrating a low pressure cooker having short water legs, one of which serves to collapse the containers thus releasing substantially all of the headspace air from the containers before they enter a cooking chamber.

DESCRIPTION OF THE PREFERRED EMBODIMENT

As illustrated in FIGURES 1–6, an atmospheric cooking and cooling apparatus 20 is provided to continuously cook products, preferably food products, filled in flexible containers or pouches 22 (FIGS. 7–10). Although the flexible containers may be formed of other materials, a heat sealable, laminated film having an outer layer formed of a polyester resin film sold under the trade name of "Mylar," a central layer of thin aluminum, and an inner layer of polyethylene has been used quite successfully. Prior to being filled, the lower edge 24 and side edges 26 and 28 of side walls 30 and 32 of the container are hermetically sealed by application of heat and pressure to provide a flat container having an unsealed or open upper end portion 34 which defines the mouth 36 of the container. A one-way valve 38 is formed in the mouth 36 of the container as will be described hereinafter.

The atmospheric cooking and cooling apparatus 20 (FIGS. 1 and 2) comprises a housing 40 defined by side walls 42 and 44, end walls 46 and 48, a roof 50, and a floor 52 all secured together in fluid tight relationship as by welding. A downwardly inclined inlet tunnel 52 which also serves as a gas vent, is formed in the end wall 46, and a downwardly inclined discharge tunnel 54 is formed in the end wall 48 to permit an endless conveyor 55 to pass therethrough and to partially trap steam in the housing 40. The lower portion of the housing is filled with water W which is heated to about the boiling point of water by steam from a manifold 56. After the conveyor 55 has moved the containers 22 through the hot water and past a sealing mechanism 57, which seals the mouths of the containers while partially submerged, the cooked and sealed containers are moved out of the housing 40, are cooled by water sprayed from a cooling system 58 and are thereafter removed from the conveyor. The cooling water may be collected in a trough 59 or the like.

In order to define a sealing zone having a substantially pure saturated steam atmosphere therein, a baffle 61 is welded to the side walls 42 and 44 and roof 50 and projects downwardly to a point slightly above the path of movement of the containers. It will be recognized that most of the air and cooking gases will be expelled from the containers prior to reaching the sealing zone and accordingly will enter the portion of the apparatus on the left (FIG. 1) of the baffle 61. The input flow of steam from the manifold 56 and from valved conduits 56a and 56b will be sufficient to maintain a substantially pure steam atmosphere in the sealing zone and will also be sufficient to continuously bleed steam and air out of the inlet tunnel 53 to maintain a substantially saturated steam environment in the portion of the housing to the left (FIG. 1) of baffle 61.

The endless conveyor 55 comprises a pair of parallel endless chains 60 and 62 (FIG. 2) trained through tracks 64 and 66, and around pairs of sprockets 68, 69, 70, 71, 72, 73, 74 and 75 which are keyed to shafts 78, 79, 80, 81, 82, 83, 84 and 85, respectively. A motor 86 is connected to the shaft 82 by a chain drive 88 and continuously drives the conveyor 55 in the direction indicated in FIGURE 1.

As best indicated in FIGURES 2, 3 and 4, alternate ones of the pivot pins 90 of the chains 60 and 62 project inwardly of the apparatus 20 and have enlarged heads 92 on their inner ends. The pivot pins 90 on one chain are axially aligned with similar elongated pins on the other chain and serve to support container carriers 94 therebetween.

Each container carrier 94 is adapted to support a row of the flexible containers 22, only one container being illustrated in FIGURE 2. Each carrier 94 comprises a transversely extending channel body 95 having supporting arms 96 welded to opposite ends, and having hooks 98 (FIG. 3) on their upper ends. The hooks are manually or automatically placed on associated ones of the axially aligned pivot pins 90.

Each container 22 is connected to one of the carriers 94 by three clamps 100. One of the clamps 100a grips the lower edge 24 of the flexible container 22 to prevent flotation of the container when submerged, and the other clamps 100b and 100c grip the side edges 26 and 28 of the container opposite the mouth 36. As indicated in FIGURE 2, the upper clamps 100b and 100c are mounted near the upper ends of bars 102 and 104 that are outwardly bowed or resiliently stressed to apply a tensioning force across the mouth 36 of the container. This tensioning of the container across the mouth 36 provides the above mentioned one-way valve 38. A tensioning force of between about ½ to 1½ pounds has been found to be desirable when a lamined "Mylar" container that is about five inches wide is being processed.

As best shown in FIGURE 4, each clamp 100 comprises a body 106 that is connected to the associated channel body 95 or resilient bar 102, 104 as by bolting. A clamping jaw 108 is pivotally connected to the body by a pin 110. The jaw 108 is urged into gripping engagement with the container 22 by a compression spring 112 which is fitted between the body 106 and an enlarged head 114 on a jaw actuating lever 116. The jaw actuating lever 116 includes a plunger 118 which is slidably received in an opening 120 in the body 106 and has an upper pivot portion 122 bent at right angles to the plunger 118 and extending through a hole in the jaw 108.

Thus when it is desired to clamp a filled flexible container to one of the carriers 94, the plungers 118 of the three associated clamps 100 are depressed thereby opening the jaws 108 permitting the appropriate edge of the flexible container to be placed therein. The plungers 118 are then released thus permitting the springs 112 to urge the jaws 108 into firm gripping engagement with the container. The resilience of the bars 102 and 104 provides the necessary tensioning forces across the mouth 36 of the container thereby defining the aforementioned one-way valve 38, which valve allows gases to be discharged from the container but prevents fluids from entering the container.

The sealing mechanism 57 (FIGS. 5 and 6) comprises an electrically heated sealing bar 130 and a cooperating pressure resisting anvil 132. The sealing bar 130 is preferably heated to about 425° F. and, during the sealing operation, the mouth 36 of the container 22 is disposed between the sealing bar 130 and anvil 132 and is subjected to a sealing pressure of about 30 p.s.i. for about 1½ seconds.

The sealing bar 130 and anvil 132 are of sufficient length to simultaneously seal all the containers supported by one of the carriers 94. The sealing bar 130 is bolted to arms 134 that are keyed to and project downwardly from a shaft 136 journaled in the side walls 42 and 44 of the housing 40. Similarly, the anvil 132 is bolted to arms 138 that are keyed to and project downwardly from a shaft 140 journaled in the side walls 42 and 44. Meshing gears 142 and 144 are keyed to the shafts 136 and 140, respectively, and assure equal and opposite pivotal movement of the shafts. The sealing bar 130 and anvil 132 are pivoted between an upper inactive position and a lower active or sealing position by a pair of hydraulic power units 146 mounted on opposite sides of the housing 40. Each power unit 146 (FIG. 6) includes a cylinder 148 which has one end pivotally mounted on the adjacent housing all by a bracket 150 and has a piston rod 152 projecting out of the other end and pivotally connected to a lever 154 and is keyed to the shaft 140.

The sealing mechanism 57 is operated in timed relation with the movement of the conveyor 55 by a four-way valve 156 which is connected to a hydraulic pump (not shown) by a high pressure line HP and a low pressure line LP. A core 158 within the valve 156 is shifted by cam lobes 160 of a cam 162 keyed to conveyor shaft 81 between a cross-passage position and a parallel passage position. When in the cross-passage position, high pressure fluid is directed into the cylinder 148 through conduit 164 and low pressure fluid returns to the pump (not shown) through conduit 166, through a cross-passage in valve core 158, and through low pressure conduit LP thereby causing the sealing bar 130 and anvil 132 to move to the active sealing position. When the valve core 158 is shifted to the parallel passage position, hydraulic fluid flows through the cylinder 148 in the opposite direction thereby causing the sealing bar 130 and anvil 132 to move to the inactive raised position. Speed control valves 168 and 170 are placed in the conduits 164 and 166 to control the rate of movement of the piston rod 152 as is well known in the art.

It will be recognized that the arcuate span of the cam lobes 160 determine the duration of application of sealing pressure on the container mouth. It will also be understood that the conveyor 55 travels quite slowly, for example, about ten carriers per minute, and that the momentary stopping of the upper end of the flexible containers by the sealing mechanism 57 has little if any tendency to stop the carriers 94. If any such stopping force is transmitted to the carriers, it will be noted that the carriers are free to pivot about their supporting pivot pins 90 thereby preventing injury to the containers.

In the operation of the atmospheric cooking and cooling apparatus 20, filled flexible containers 22 with their upper ends unsealed are clamped to the carriers 94 by the clamps 100 as indicated in FIGURE 7. The resilience in the bars 102 and 104, which bars support the upper clamps 100b and 100c, tension the container mouths 36 thereby providing a one-way valve 38 in each mouth. The carriers are then placed on the associated pivot pins 90 for movement by the continuously driven conveyor 55 through the housing 40 in the direction indicated by arrows in FIGURE 1.

The cooking of the contents of the containers begins as the containers enter the steam atmosphere within the housing 40 and continues as the containers are advanced through the hot water in the lower portions of the housing. The steam entering the housing 40 to the right of baffle 61 through the manifold 56 and conduits 56b flows out of the discharge tunnel 54 at a sufficient rate to provide a substantially pure steam atmosphere in the sealing zone. Similarly, steam enters the housing 40 to the left of the baffle 61 through the manifold 56 and conduit 56a and flows out of the discharge tunnel 53 at a sufficient rate to bleed substantially all of the air and cooking gases therefrom so that the atmosphere in the portion of the cooker is substantially saturated steam.

When the containers are being heated, gases in addition to the air already in the container are formed within the head space in each container. These gases include steam formed within the containers, interstitial air which has been replaced with steam as the vapor pressure of water in the product rises, and also include dissolved and occluded air and other cooking gases. When the containers are partially, or fully, submerged in the heat treatment liquid, the pressure acting upon the external surfaces of each container, due to the pressure head of the liquid, partially or fully collapses the container thereby forcing air, cooking gases and steam out of the container through the one-way valve 38 as diagrammatically illustrated in FIGURE 9. The amount of tension applied across the mouth 36 of the flexible container is inversely proportional to the rate of flow of gases from within the container, and such rate of flow may be controlled as desired by increasing or decreasing the mouth tension. It will be understood, however, that FIGURE 9 illustrates the shape of the container only when the container is first submerged to the level of the one-way valve 38. This submergence causes gas to escape from the head space past the valve 38 due to hydrostatic pressure acting on the walls of the container. Since even relatively large traverse tensioning forces across the container mouth provides only a very small valve closing force in the directions indicated by arrows F (FIG. 9), since the pressure above the water level is atmospheric, and since the pressure acting on the external surfaces of the container below the water level is somewhat greater than atmospheric, gas within the submerged portion of the container will at all times be subjected to a pressure greater than atmospheric pressure and accordingly will eventually escape from the container through the one-way valve 38.

After the gases have been purged from the containers, the containers are moved into engagement with the sealing mechanism 57, and the mouth 36 of each container is sealed thereby providing hermetically sealed flexible containers. The product within the cooked and sealed container continues to be cooked until the containers are advanced out of the housing 40 and moves under the water sprays from the cooling system 58 thereby terminating the cooking operation. The carriers 94 are then removed from the conveyor 55 and the hermetically sealed flexible containers 22 are released from the carriers and are replaced by filled but unsealed containers to be processed. The loaded carriers are then hooked onto the conveyor 55 and the above described operation is repeated.

Although the flexible containers illustrated in FIGURES 7–10 have a mouth 36 which is about five inches wide, it will be understood that flexible containers that have a much wider mouth may also be processed by the apparatus 20 in accordance with the method of the present invention. FIGURE 11 illustrates a carrier 94' having clamps 100a', 100b' and 100c' which firmly grip a wide container 22'. The mouth of the container 22' is provided with a partial seal 175 after filling and prior to cooking thus making it possible to handle wide mouth flexible containers without danger of inadvertently spilling the product therefrom. It should be understood, however, that the opening 176 in the container mouth should be sufficiently large to allow gas to readily escape from the container 22', and that the resilient bars 102' and 104' provide a sufficient tensioning force across the opening 176 to provide a one-way valve 38'.

A second embodiment 20a of the cooking and cooling apparatus of the present invention is illustrated in FIGURE 12. The apparatus 20a is identical to the apparatus 20 except that the sealing mechanism 57a is positioned to seal the containers when they are positioned in the substantially pure steam atmosphere in the housing 40a at the right of the baffle 61a. Also the run of the conveyor 55a which passes through the housing 40a is trained along a zigzag path 180 defined by pairs of sprockets 182 thereby causing the cooking of the contents of the container 22 to occur primarily in the more effective steam cooking atmosphere above the hot water W'. The containers are periodically lowered into the water W' to purge air, steam, and cooking gases from the containers before sealing the same.

It will be understood that much of the headspace air carried in the container will be eliminated at the first submersion. The purpose of the second and subsequent submersions is to expell gases which are gradually removed from solution as the temperature of the container rises, and to expell those gases which are released from the introcellular structure of the food product or are formed upon decomposition of the product during processing.

It will also be understood that sealing of the containers processed by the apparatus 20 (FIG. 1) or the apparatus 20a (FIG. 12) may occur either when the containers are partially submerged as illustrated in FIGURE 1 or when the containers are disposed in a steam atmosphere as indicated in FIGURE 12.

Both of the above described atmospheric cooking and cooling apparatus 20 and 20a are ideally suited to handle products such as fruit which may be cooked and tenderized at temperatures below 212° F. However, many low acid products such as vegetables and meat products, for example, require that sterilizing temperatures be used which are above that of the boiling point of water at atmospheric pressure.

A high presure cooking and cooling apparatus 20b in the form of a hydrostatic cooker is illustrated in FIGURE 13. Since many components of the apparatus 20b are similar to those of the apparatus 20, parts of the apparatus 20b which are equivalent to those of the apparatus 20 will be assigned the same numeral followed by the letter "b," and only those parts of the apparatus 20b which differ from the apparatus 20 will be described in detail.

The apparatus 20b includes a housing 40b which comprises a pair of spaced vertical support walls 189 (only one wall being shown) that are supported in spaced parallel position. A housing 191 that extends between the two walls 189 has a roof 192 and two depending walls 193 and 194 which cooperate with the two walls 189 to define a cooking chamber 195 which is filled with steam at a predetermined cooking pressure and temperature, for example, at about 250° F. and 15 p.s.i. gauge. The lower end of the housing 191 opens into a water filled trough 196 which is formed by the two walls 189, a transverse horizontal floor plate 197 and the lower end portions of two transverse vertical walls 198 and 199. The wall 198 cooperates with another transverse vertical wall 200 to define an inlet hydrostatic water leg 201, and the wall 199 cooperates with a transverse vertical wall 202 to provide an outlet hydrostatic leg 203. The hydrostatic legs 201 and 203 communicate with the trough 196 and are filled with water from conduits 203a so as to create a sufficient pressure to resist the pressure of steam in the cooking chamber 195. Steam is directed into the cooking chamber 195 through a manifold 204 and a valved conduit 205.

The inlet hydrostatic water leg 201 is thermostatically controlled to provide a gradually increasing water temperature from approximately 210° F. at its upper end to approximately 245° F. at its lower end. The outlet water leg 203 is also thermostatically controlled to provide a gradually increasing water temperature from approximately 245° F. at its lower end to any suitable temperature below the boiling point of water at atmospheric pressure, depending upon the type of product being processed, at the upper end thereof. Steam is added to the water in the hydrostatic inlet leg to provide the desired heating temperature therein and cooling water is directed into the cooling leg 203 to provide the desired cooling temperature therein.

The processing conveyor 55b is continuously driven by a motor 207 which is connected to drive shafts 208 by chain drives 209. The processing conveyor is trained around sprockets 210 that are rotatably supported by the vertical walls 189 and is guided along a circuitous path by guide rails (not shown).

Thus, the filled but unsealed containers 22b are clamped to the carriers 94b as in the other embodiments of the invention and are continuously moved by the conveyor 55b in the direction indicated by the arrows in FIGURE 13. The containers move downwardly through the inlet hydrostatic leg 201 during which time the containers are completely submerged. Because the containers remain in the hydrostatic inlet leg 201 for a substantial period and are heated to about 245° F. substantially all headspace gases and cooking gases which form within the containers are forced out of the one-way valves at this time due to the hydrostatic heads acting on the external surfaces of the containers. The containers then enter and move through the highly efficient, high temperature steam atmosphere within the cooking chamber 195 thereby cooking the product. During this time the only gases produced are gases removed by decreasing solubility owing to temperature rise, and by gases generated in the product due to the high temperature of the process. As indicated in FIGURE 13, the containers move along a vertically extending zigzag path while in the cooking chamber 195 and enter the water in the trough at the lowermost portions of the path so as to periodically collapse the containers thereby forcing the minor amounts of gas formed within the containers through the one-way valves. It will be understood that only minor amounts of gas are released from the containers into the sterilizing chamber 195, and that this gas may be continuously or intermittently purged from the chamber 195 through a valved vent conduit 211.

The mouths of the containers are thereafter sealed by a sealing mechanism 57b while the containers are either partially submerged, or when entirely disposed in steam at the superatmospheric pressure in chamber 195. Although FIGURE 13 indicates that sealing occurs when the containers are partially submerged, it will be understood, as mentioned above, that the sealing mechanism 57b may seal the containers when the containers are disposed in the high pressure steam environment of the chamber 195.

The cooked and sealed containers are then cooled during upward movement through the outlet hydrostatic leg 203. In this regard, after the sterilized and sealed containers leaves the sealing mechanism 57b in chamber 195, they move downwardly through the water in the trough 196 and then upwardly through the cooling leg 203. As the containers enter the water in the trough 196 below the hydrostatic leg 203, they will be at a temperature nearly equal to the sterilizing temperature. As the containers move downwardly, the hydrostatic pressure on the containers increase reaching a maximum at the low point in their path of movement. The temperature of the water in the lowest point of the path must be maintained at temperatures which reduce the temperature in the containers a degree or two thereby causing the water vapor in head space of each container to condense and causing the container walls to collapse. Cooling continues as the containers progress up the hydrostatic cooling leg 203, and the temperature gradient in the hydrostatic leg is maintained at a level sufficient to cool the containers at a rate which will prevent reformation of water vapor in the head space of the container as the container ascends the hydrostatic leg and as the pressure decreases. For example, the temperature in each container, prior to exiting from the top surfaces of the hydrostatic leg 203 needs only to be a degree or two below 212° F. in order to prevent the development of excess pressure within the container. This is because the amount of non-condensable gases within the containers is extremely small in relation to the potential head space of each partially filled container. Thus, even though the containers seals are quite weak at temperatures on the order of 240°–250° F. used in hydrostatic cookers, rupture of these seals will not occur since, after the container has been sealed, the cooling water in the hydrostatic leg 203 is maintained sufficiently low to condense the aqueous vapor within the containers.

After the containers have been cooled, they are conveyed to a feed and discharge station 215 where the carriers 94b having the processed containers thereon are removed from the conveyor 55b, and other carriers 94b having unsealed containers clamped thereon are placed on the conveyor 55b for processing as above described.

The cooking and cooling apparatus 20c disclosed in FIGURE 14 nearly illustrates an apparatus wherein flexible contains 22c can be processed partially in an atmospheric cooker 216 of the type disclosed in either FIGURE 1 or FIGURE 12, and the process can be completed in a superatmospehric hydrostatic cooker 218 of the type disclosed in FIGURE 13. The apparatus 20c includes a common conveyor 55c for advancing the carriers 94c and containers 22c through the cooker. It is well known that in many food products a temperature of about 150° F. will release substantially all of the gases from the food product which are formed due to cooking the product. Thus, in the appaartus 20c the containers are sealed by a heat sealing mechanism 57c while partially submerged in water at 212° F. in the atmospheric cooker 216, and are thereafter moved through the hydrostatic cooker 218 to complete the cooking processes under high temperatures and superatmospheric pressures, for example at a temperature of about 250° F. and a pressure of about 15 p.s.i. gauge.

The cooking and cooling apparatus 20d (FIG. 15) of the fifth embodiment of the invention illustrates an atmospheric cooker which resembles the hydrostatic cooker of FIGURE 13. Accordingly parts of the apparatus 20d which are similar to those of the apparatus 20b will be assigned the same numerals used in FIGURE 13 followed by the letter "d," and only the parts of the apparatus 20d that are different from those of the apparatus 20b will be described in detail.

The apparatus 20d includes a housing 40bd having a short inlet water leg 201d, and a short discharge water leg 203d which communicate with the cooking chamber 195d through a trough 196d. An endless conveyor 55bd is trained through the water legs, housing, and trough and is driven in the direction of the arrows in FIGURE 15 by a motor 207d and suitable drive system. Water at about 212° F. is maintained in the trough 196d and in the water legs 201d and 203d. The water is heated to the boiling point by steam from a manifold 204d, and the cooking chamber 195d is filled with steam at 212° F. from a valved conduit 205d.

As in the other embodiments of the invention the partially filled flexible containers 22d are clamped onto the carriers 94bd, the carriers are hooked onto the conveyor 55bd and the loaded carriers are advanced through the apparatus 20d in the direction indicated by the arrows in FIGURE 15. It will be noted that as the carriers enter the inlet water leg 201d the hydrostatic water pressure acting on the external surfaces of the containers will collapse the same thereby forcing the headspace gas and some interstitial gas, which gas comprises the major portion of the non-condensible gas that must be released from the containers prior to sealing, out of the containers 22d through the one-way valves before the containers enter tthe confined cooking chamber 195d. Thus, only the relatively minor amounts of non-condensible gases that are formed in response to heating the containers are discharged from the containers into the cooking chamber 195d and must be purged therefrom. This non-condensible gas is purged from the chamber 195d through a valved conduit 211d with a portion of the steam which flows into the chamber 195d from conduit 205d. The rate of flow of steam through the chamber 195d is sufficient to maintain a substantially pure steam atmosphere within the chamber 195d.

Prior to leaving the cooking chamber 195d, the flexible containers 22d are sealed while disposed in the steam atmosphere by the sealing mechanism 57bd. It will be understood, however, that the sealing mechanism 57bd may be lowered, if desired, so as to seal the containers when they are partially submerged in the 212° F. water in the trough 196d. The sealed containers 22d are subsequently moved out of the cooling water leg 203d and are then cooled by water sprayed from a manifold 225 and by passage through cold water in a trough 226. The processed and cooled containers are then removed from the carriers 94bd and conveyor 55bd thereby completing the cycle of operation.

Although each embodiment of the cooking and cooling apparatus disclosed herein illustrates the containers as being sealed while the mouths of the containers are in a substantially pure steam atmosphere, it will be understood that the one-way valve 38 permits sealing to take place when the mouths of the containers are in an atmosphere of air without danger of the product becoming contaminated with air.

It will be understood that when cooking or sterilizing in saturated steam or hot water, the aqueous liquids within the containers will always be at a slightly lower temperature than the cooking medium and accordingly will not boil. It will also be understood that the packaged food product usually contains salts or sugars which raise the boiling point of liquids in the containers several degrees. Thus, there is no tendency for the product to froth or foam and flow out of the containers with the gases.

From the foregoing description, it will be apparent that the method of the present invention may be performed either under atmospheric or under super-atmospheric conditions. In accordance with the method, a filled flexible container having its mouth open is subjected to a tensioning force across the mouth which defines a one-way valve and permits gases to flow out of the container while preventing gases or liquids from flowing into the container. The flexible container is then moved through a heating medium which increases the pressure of the gases within the head space of the flexible container. The containers are then partially or fully submerged in a liquid thereby increasing the forces acting on the external surfaces of the container which collapse the container thereby forcing air, steam and cooking gases out of the container through the one-way valve. The mouth of the container is thereafter sealed by application of pressure and heat.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. A method of processing products filled in a flexible container which has an open edge defining a container mouth and has all other edges sealed, comprising the steps of applying a closing force across the unsealed mouth of the container to provide a one-way valve, subjecting the container to a heat treatment medium that includes a liquid to heat the product in the container, submerging a portion of the container in the heating liquid to collapse the same and force gas within the container outwardly through the one-way valve, and sealing the mouth of the container.

2. A method according to claim 1 wherein said mouth closing force is a tensioning force.

3. A method according to claim 1 wherein the product is a food product having moisture therein and wherein the heat treatment medium raises the product to a temperature sufficient to form an aqueous vapor within the container, and wherein the hydrostatic pressure acting on the external surfaces of the container when said portion of the container is submerged forces air, cooking gases and aqueous vapors out of the container through the one-way valve.

4. A method according to claim 3 wherein said heat treatment medium raises the temperature of the product to about 240° F., and wherein carbon dioxide is formed in the container by the high temperature cooking and is expelled from the container prior to sealing by said hydrostatic pressure thereby providing a superior flavored food product.

5. A method according to claim 2 and additionally comprising the step of cooling the container after the mouth has been sealed to terminate cooking of the product.

6. A method according to claim 1 wherein the mouth is sealed when the container is partially submerged and when the mouth is in a steam atmosphere.

7. A method according to claim 1 wherein the mouth is sealed when the entire container is disposed in a steam atmosphere.

8. A method of processing products in a partially filled flexible container which has an open edge defining a container mouth and has all other edges hermetically sealed comprising the steps of applying a tensioning force across the unsealed mouth of the container to provide a one-way valve, passing the container through a heating medium which includes a liquid portion to heat the product within the container and to form an aqueous gas therein, partially submerging the container in the heating liquid to collapse the same and thereby force the gases within the container outwardly through the one-way valve, and sealing the mouth of the container to provide a hermetically sealed container.

9. A method according to claim 8 wherein the container is cooled after sealing to terminate cooking of the product.

10. A method according to claim 8 wherein the sealing occurs when the container is partially submerged in the liquid.

11. A method according to claim 8 wherein the heating occurs partially in a steam atmosphere and partially in hot water.

12. A method according to claim 11 wherein the gases released into the steam atmosphere are continuously vented therefrom to provide a substantially pure steam atmosphere and improve the cooking efficiency of the atmosphere.

13. A method according to claim 11 wherein the steam is saturated steam maintained at superatmospheric pressure 14. A method according to claim 13 wherein the container is completely submerged during a portion of the cooking step and prior to being sealed.

15. A method according to claim 14 wherein the product is a food product, wherein carbon dioxide is formed during cooking of the product at high temperature, and wherein this carbon dioxide is expelled from the container through the one-way valve prior to sealing thereby providing a better tasting product.

16. A method according to claim 8 wherein said container is sealed by the application of heat and pressure to the mouth of the container.

17. A method of processing products in a partially filled flexible container which has an open edge defining a container mouth and has all other portions hermetically sealed comprising the steps of gripping the container and applying a tensioning force across the unsealed mouth of the container to provide a one-way valve, continuously moving the container along a predetermined path through a heating medium which heating medium includes a liquid portion to heat the product within the container resulting in the formation of gases therein, moving the container through a liquid portion to squeeze the container and thereby force gases within the container outwardly through the one-way valve, and sealing the mouth of the container to provide a hermetically sealed container.

18. A method according to claim 17 and additionally comprising the steps of subjecting the container to a cooling medium after the container has been sealed to condense the condensible gases within the container and to maintain the pressure within the container less than that acting upon the external surfaces of the container.

19. A method according to claim 18 wherein movement of the container along said path first moves the container into a steam heating medium, then moves the container into a liquid heating medium during which time the container is sealed, then moves the container into a steam heating medium, and finally moves the sealed container into the cooling medium.

20. A method according to claim 18 wherein movement of the container along said path first moves the container through a liquid heating medium, then moves the container through a steam heating medium wherein the container is sealed, and finally moves the container through a cooling liquid.

21. A method according to claim 20 wherein said steam heating medium is under superatmospheric pressure.

22. A method according to claim 17 wherein the container is completely submerged in a liquid prior to sealing.

23. A method according to claim 21 wherein the container is completely submerged in a liquid prior to sealing.

24. An apparatus for processing products in a partially filled flexible container which has an open edge defining a container mouth and has all other edges hermetically sealed, comprising means for gripping the container and applying a closing force across the unsealed mouth of the container, a heat treatment apparatus, means for moving the container into the heat treatment apparatus, means for directing a heat treatment medium therein which includes a liquid portion, means for submerging a portion of the container in the liquid to collapse the flexible container and force gas within the container through the one-way valve in said mouth, and means for sealing the container.

25. An apparatus according to claim 24 wherein the flexible container is sealed while the portion of the container is submerged, said submerged portion extending substantially from the lower end of the container to said one-way valve.

26. An apparatus according to claim 24 wherein the flexible container is sealed while the entire container is disposed within a substantially pure steam atmosphere.

27. An apparatus according to claim 24 wherein the flexible container is a heat sealable container and wherein said sealing means applies heat and pressure to the container mouth to seal the same.

28. An apparatus according to claim 24 wherein said moving means is a driven endless conveyor which continuously advances the containers through said apparatus, and wherein said heat treatment medium is steam and water, said conveyor being trained along a path which advances the containers selectively through the steam and water.

29. An apparatus according to claim 28 wherein the steam is maintained at superatmospheric pressure.

30. An apparatus according to claim 29 wherein the heat treatment apparatus is a hydrostatic cooker comprising means defining a vertically extending water filled inlet leg, means defining a vertically extending water containing discharge leg, and means defining a steam filled chamber communicating therewith.

31. An apparatus according to claim 30 wherein the inlet leg is elongated and has a preheating liquid therein which gradually increases in temperature in the direction of movement of said conveyor, and wherein said discharge leg is elongated and has a cooling liquid therein which gradually decreases in temperature in the direction of movement of the conveyor, the temperature of the cooling liquid being sufficiently low to assure that the pressure within the container does not exceed the pressure acting on the external surface of the container when the container is moving through said discharge leg.

32. An apparatus according to claim 28 wherein said conveyor is adapted to simultaneously move a plurality of containers through said heat treatment apparatus and wherein said sealing means is adapted to simutlaneously seal several containers.

33. An apparatus according to claim 24 wherein the flexible container is sealed when its mouth is disposed in a saturated steam atmosphere maintained at a superatmospheric pressure.

References Cited

UNITED STATES PATENTS

| 2,380,134 | 7/1945 | Waters | 99—214 X |
| 3,037,869 | 6/1962 | Esson et al. | |
| 3,261,140 | 7/1966 | Long et al. | |
| 3,108,881 | 10/1963 | Shaw et al. | 99—171 |
| 3,377,173 | 4/1968 | Van Der Winden | 99—214 |

FOREIGN PATENTS 4,743 of 1881   4/1882   Great Britain.

TIM R. MILES, Primary Examiner

U.S. Cl. X.R.
99—214, 252, 362

PO-1050
(5/69)

UNITED STATES PATENT OFFICE
CERTIFICATE OF CORRECTION

Patent No. 3,501,318      Dated March 17, 1970

Inventor(s) D.C. Wilson

It is certified that error appears in the above-identified patent and that said Letters Patent are hereby corrected as shown below:

Column 4, line 16 - change "52" to -- 53 --. Column 5, line 8 - change "lamined" to -- laminated --. Column 5, line 30 - change "forces" to -- force --. Column 6, line 45 - change "container" to -- containers --. Column 14, line 17 - change "simutlaneously" to -- simultaneously --.

Signed and sealed this 3rd day of August 1971.

(SEAL)
Attest:

EDWARD M. FLETCHER, JR.
Attesting Officer

WILLIAM E. SCHUYLER, JR.
Commissioner of Patents